United States Patent [19]

Wattron, et al.

[11] Patent Number: 5,107,663
[45] Date of Patent: Apr. 28, 1992

[54] FARM MACHINE HAVING A DEFORMABLE SUSPENSION MECHANISM

[75] Inventors: Bernard Wattron, Saverne; Roland Helfer, Lampertheim, both of France

[73] Assignee: Kuhn s.a., Saverne Cedex, France

[21] Appl. No.: 616,917

[22] Filed: Nov. 21, 1990

[30] Foreign Application Priority Data

Nov. 24, 1989 [FR] France ............... 89 15684

[51] Int. Cl.⁵ .................................. A01D 34/66
[52] U.S. Cl. ........................... 56/15.7; 56/218; 56/DIG. 10; 56/DIG. 14
[58] Field of Search ............ 56/15.7, 14.7, 15.8, 56/13.6, 218, DIG. 3, DIG. 10, DIG. 14

[56] References Cited

U.S. PATENT DOCUMENTS

| | | | |
|---|---|---|---|
| 2,005,618 | 6/1935 | Graham | 172/281 |
| 4,177,625 | 12/1979 | Knight et al. | 56/15.8 X |
| 4,177,627 | 12/1979 | Cicci | 56/15.8 |
| 4,771,591 | 9/1988 | Ermacora | 56/13.6 |
| 4,860,527 | 8/1989 | Maarten | 56/13.6 |

FOREIGN PATENT DOCUMENTS

| | | |
|---|---|---|
| 0297012 | 12/1988 | European Pat. Off. . |
| 2086286 | 12/1971 | France . |
| 2110911 | 6/1972 | France . |
| 2414863 | 8/1979 | France . |
| 2608362 | 6/1988 | France . |
| 2614755 | 11/1988 | France . |
| 2052237 | 1/1981 | United Kingdom . |
| 1583983 | 2/1981 | United Kingdom . |

*Primary Examiner*—Terry Lee Melius
*Attorney, Agent, or Firm*—Oblon, Spivak, McClelland, Maier & Neustadt

[57] ABSTRACT

A farm machine comprises at least one group of working elements and a structure having a hitching mechanism for hitching the farm machine to a motor vehicle during work. The group of working elements is connected to the structure which comprises a tongue (hitching mechanism), and a frame through a deformable quadrilateral suspension device which comprises suspension elements each one of which is connected to the structure through a first joint and to the group of working elements through a second joint.

61 Claims, 7 Drawing Sheets

FARM MACHINE HAVING A DEFORMABLE SUSPENSION MECHANISM

BACKGROUND OF THE INVENTION

1. Field of the Invention

The present invention relates to a farm machine comprising at least one group of working elements and a structure equipped in particular with a hitching mechanism making it possible, during the use of the farm machine, to hitch the latter to a motor vehicle. The group of working elements is connected to the structure by a deformable quadrilateral suspension device comprising suspension elements connected, on the one hand, to the structure by first joints and, on the other hand, to the group of working elements by second joints.

2. Description of the Related Art

A pulled mower comprising a frame which extends crosswise to the direction of advance at work is known. At each of its ends, this frame is equipped with a wheel by which it rests on the ground. In the median part, the frame is connected to a tongue which makes it possible to hitch the mower to a tractor and which is connected to the frame by a joint with vertical axis. The frame supports a group of working elements by a deformable parallelogram suspension device. This device comprises two pairs of connecting rods each extending near one end of the frame.

A mower intended to be hitched to the front hitch of a tractor and whose group of mowing elements is also connected to the frame by a deformable parallelogram suspension device is also known. The frame of this known mower comprises a central bracket which is equipped at its rear part with a hitching triangle making it possible to hitch the mower to the front hitch of the tractor and which extends above the group of mowing elements. The latter is connected to the front part of the bracket by the deformable parallelogram device which comprises three connecting rods: one upper connecting rod and two lower connecting rods. The upper connecting rod is connected to the bracket by a first ball joint and to the mowing group by a second ball joint. The two lower connecting rods are each connected to the bracket by a ball joint and to the mowing group by a cylindrical joint. Moreover, they extend in top view at least approximately parallel in the direction of advance at work, so that the ball joints of the two lower connecting rods are very distant from one another.

Because of the deformable parallelogram, the group of working elements of these known machines can go up and down freely. The pivoting of the group of working elements around a straight line directed forward can be achieved in the first machine, only because the two pairs of connecting rods are relatively distant from one another and, in the second machine, only because the cylindrical joints comprise relatively significant plays. In all cases, however, this pivoting is relatively limited.

SUMMARY OF THE INVENTION

Accordingly, an object of this invention is to provide a novel farm machine comprising a suspension device not exhibiting the above-mentioned drawbacks.

For this purpose, a first farm machine according to this inventive idea is characterized by the fact that its suspension device comprises:

a) two suspension elements forming a deformable quadrilateral in a vertical or substantially vertical direction; and b) one or more lateral suspension elements;

c) the axes of the first joints of the two suspension elements and the axis of the second joint of the second suspension element define a first plane or substantially a first plane, which is vertical or substantially vertical and directed forward during the work;

d) the axis of the first joint and the axis of the second joint of a lateral suspension element define with the axis of the second joint of the second suspension element a second plane or approximately a second plane which intersects the first plane along a first straight line;

e) the first joint of a lateral suspension element extends in the first plane or approximately in the first plane and its axis is located or approximately located on the axis of the first joint of the second suspension element;

f) the second joint of a lateral suspension element is distant from the first plane and its axis is located or approximately located on a second straight line passing through the axis of the second joint of the second suspension element and orthogonal to the first straight line.

A second farm machine according to this inventive idea is characterized by the fact that its suspension device comprises:

a) a rigid suspension element; and b) at least two rigid lateral suspension elements forming with the suspension element a quadrilateral deformable in a vertical or approximately vertical direction;

c) the axis of the first joint of the suspension element defines a first plane, which is vertical or approximately vertical and directed forward during work;

d) the axes of the first joints and the axes of the second joints of the lateral suspension elements define a second plane or approximately a second plane which intersects the first plane along a first straight line;

e) the first joints of the lateral suspension elements extend in the first plane or approximately in the first plane and their axes are merged or approximately merged;

f) the second joints of the lateral suspension elements are distant from the first plane and their axes are located or approximately located on a second straight line orthogonal to the first straight line.

Accordingly, the suspension devices of the farm machines of the invention no longer have the drawback of the suspension devices of the known farm machines.

Actually, in the farm machines of the invention, the group of working elements can:

a) be displaced perfectly vertically or approximately vertically upward and downward relative to the structure, because of the deformable quadrilateral; and b) in any position in height of the deformable quadrilateral, to pivot freely in particular around the first straight line without it being necessary to provide plays.

The lateral suspension element or elements are provided in particular to prevent a pivoting of the group of working elements around a straight line passing:

in the first machine of the invention, through the axes of the second joints of the two suspension elements; and in the second machine of the invention, through the axis of the second joint of the suspension element and through the point of intersection of the first and of the second straight line.

The suspension device of the farm machines according to the invention also offers the advantage of being able to group the first joints of the suspension elements and the lateral suspension elements in the same zone of the structure. A simplification of the design of the latter is derived from it. This makes it possible, for example, to easily equip the structure with a unit to which is connected the hitching means by which the farm machine is hitched to a motor vehicle, and which supports, if necessary, at least one part of the transmission means transmitting the movement received from a driving source to the group of working elements. This unit can be used in an entire range of farm machines of different work widths. It will be sufficient for this purpose to connect to the latter the suitable group or groups of working elements by the suspension device or devices, whose first respective joints are grouped in the same zone.

Additionally, since the second joints of the lateral suspension elements are distant from the first plane, a very good connection between the suspension device and the group of working elements is obtained. Further, these lateral suspension elements create a stiffening of the group of working elements, which is a function of the distance separating their second joints of the first plane. This in particular offers a great advantage in the machines of large work width, in which the group of working elements has a relatively large dimension.

According to an additional characteristic, the second plane is orthogonal or approximately orthogonal to the first plane when the group of working elements is horizontal.

It can, moreover, also be advantageously provided that the second joint of the first suspension element extends in the first plane or approximately in the first plane when the group of working elements is horizontal.

If the group of working elements exhibits a vertical median plane, it can, according to another additional characteristic of the invention, be provided that the first plane is merged with the median plane.

In normal work, the first plane will extend advantageously in or approximately in the direction of advance at work.

To make it possible for the group of working elements to adapt itself easily without excessive effort to the contour of the ground, it will be provided that the deformable quadrilateral is drawn at work, i.e. that the first joints of the suspension element or elements just as the lateral suspension element or elements extend, taking into account the direction of advance at work, more forward than their second joints. Advantageously, this deformable quadrilateral will even be made in the shape of a deformable parallelogram.

In the invention, it is also provided that:
the first and the second joint of the first suspension element are each of the ball joint type; and
the first joint of a lateral suspension element is of the ball joint type.

The second joint of a lateral suspension element can, of course, be of the cylindrical type. However, for a simplification of the practical embodiment, it is desirable that it be of the ball joint type.

According to an additional characteristic, at least one lateral suspension element is provided on each side of the first straight line. In this case, it is preferable that the second joints of the lateral suspension elements extend symmetrically or approximately symmetrically relative to the first straight line.

According to an additional characteristic, it is also provided that at least one of the lateral suspension elements is equipped with adjusting elements intended for the adjustment of the distance separating its first joint from its second joint. These adjusting elements first of all make possible the adjustment of the correct length of the lateral suspension element to make possible the mounting of the latter. But these adjusting elements also make possible the prestressing of the lateral suspension element, which has the effect of increasing the rigidity of the design.

In a preferred embodiment of a first machine according to the invention, the second suspension element extends higher and preferably above the first suspension element.

In a preferred embodiment of a second machine according the invention, the lateral suspension elements extend higher and preferably above the suspension element.

In some farm machines, it is desirable to limit or to prevent the displacement of the group of working elements crosswise to the direction of advance at work. For this purpose, it is provided, according to an additional characteristic, that the farm machine of the invention in addition comprises means limiting or preventing the displacement of the group of working elements crosswise to the direction of advance at work.

In an embodiment of a first machine according to the invention, it is provided that these means consist of the first joint of the second suspension element which is of the cylindrical type whose axis is orthogonal or approximately orthogonal to the first plane.

Advantageously, this first cylindrical joint will even be of the pivot type.

This joint of the cylindrical or pivot type can be made by at least one cylindrical bearing surface or by two ball joints spaced from one another and whose centers define the axis of the joint.

In another embodiment of a first machine according to the invention, it is provided that the first joint of the second suspension element is of the ball joint type and that the means limiting or preventing the displacement of the group of working elements, crosswise to the direction of advance at work, limit or stop the pivoting of the group of working elements around a straight line passing through the centers of the first joints of the suspension elements.

It can be provided that these means act directly on the group of working elements. It can also be provided that the latter act directly or indirectly on the second suspension element. In these two cases, the means can consist of two stops integral with the structure of the farm machine.

In the second case, the means can consist of an element which extends between two guide surfaces which are plane or approximately plane and parallel or approximately parallel to the first plane. If the second joint of the second suspension element is of the ball joint type, the latter does not necessarily rotate around the first straight line which constitutes its longitudinal axis, when the group of working elements rotates around the first straight line. In this case, the element extending between the two guide surfaces can have the suitable shape making possible its translation practically without play between the guide surfaces.

It can, however, be provided that the second joint of the second suspension element be of the cylindrical type. In this case, the second suspension element rotates around the first straight line which constitutes its longitudinal axis, when the group of working elements rotates around this first straight line.

Moreover, it can, according to another arrangement, be provided that the means act on the second suspension element via at least one of the lateral suspension elements.

In these two cases, the element extending between the two guide surfaces will comprise a cylindrical part whose longitudinal axis is merged or approximately merged with the first straight line. In this way, the cylindrical part can be translated practically without play between the two guide surfaces and can rotate around its longitudinal axis.

According to the arrangement considered, the lateral suspension element or elements can be either rigid or of the type essentially or only able to work in pulling. In the latter case, the lateral suspension elements can consist, for example, of cables.

In an embodiment of a second machine according to the invention, it is provided that the means limiting or preventing the displacement of the group of working elements, crosswise to the direction of advance at work, limit or stop the pivoting of the group of working elements around a straight line passing through the center of the first joint of the suspension element and the centers of the first joints of the lateral suspension elements. It can be provided that these means act directly on the group of working elements. But it can also be provided that the latter act on at least one of the lateral suspension elements. In this case, the means can consist of a cylindrical pin whose longitudinal axis is merged or approximately merged with the first straight line and two guide surfaces which are plane or approximately plane and parallel or approximately parallel to the first plane, between which the cylindrical pin extends. In this case, the cylindrical pin can be translated practically without play between the two guide surfaces and can rotate around its longitudinal axis.

Advantageously, the cylindrical pin is integral with at least one of the lateral suspension elements.

Taking into account the arrangement of the suspension devices which have just been described, the structure of the farm machine can comprise a single bracket at the front end of which are connected the suspension element or elements, just as the lateral suspension element or elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
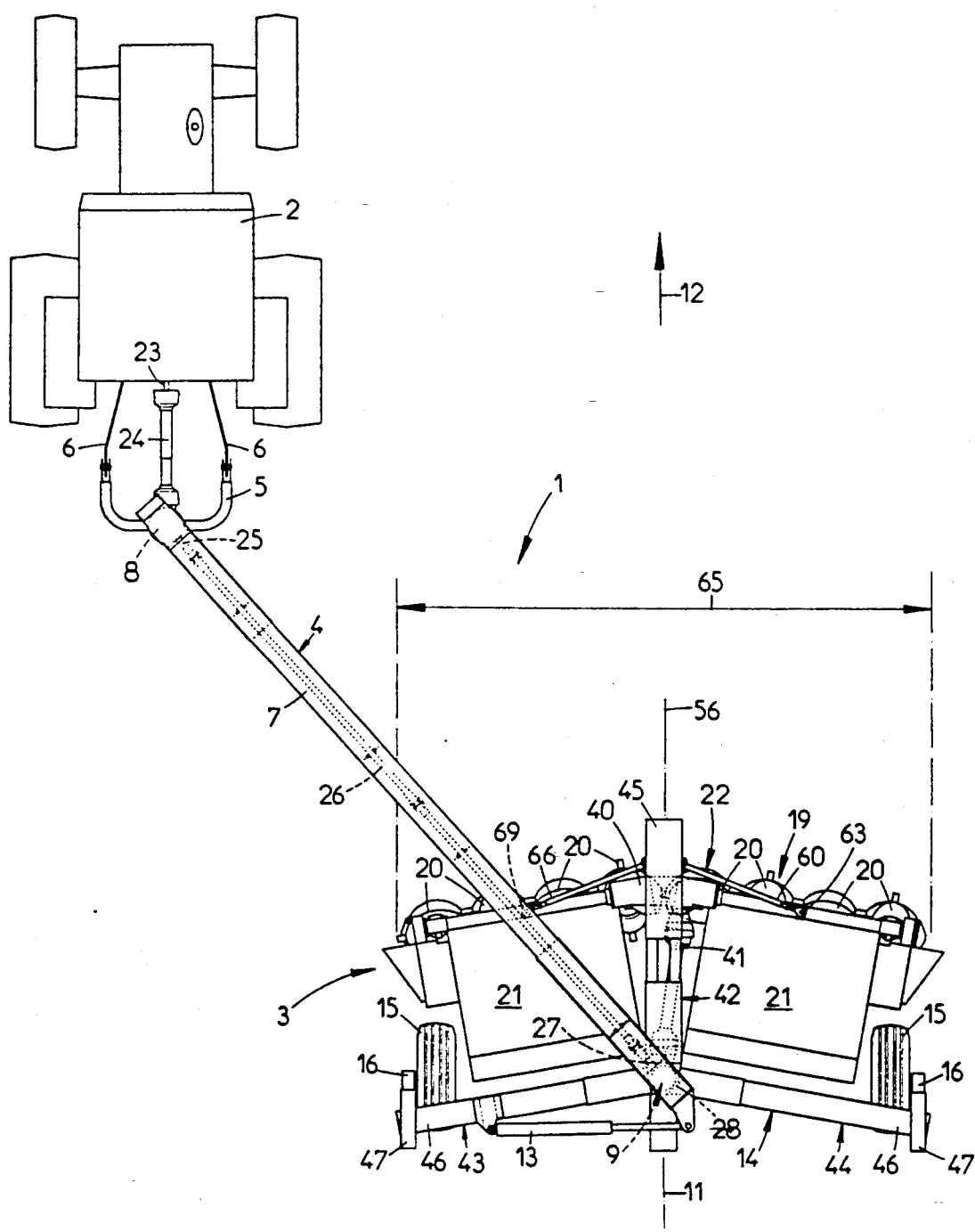
FIG. 1 shows a top view of a farm machine according to the invention hitched to a farm tractor.

Referring now to the drawings, wherein like reference numerals designate identical or corresponding parts throughout the several views, and more particularly to FIG. 1 thereof, FIG. 1 shows a farm machine according to the invention, made in the form of mower (1). The mower is hitched to a farm tractor (2).

The mower (1) consists of a body (3) and a tongue (4). Tongue (4) consists of a primary tongue (5) intended to be hitched to lower arms (6) of the hitch of farm tractor (2) and a secondary tongue (7) connected to body (3) of mower (1). Primary tongue (5) is connected to the front end of secondary tongue (7) by a connecting device (8) known to one skilled in the art and which allows in particular a pivoting of primary tongue (5) relative to secondary tongue (7) around a substantially vertical axis. Near its rear end, secondary tongue (7) is connected to body (3) by a joint (9) with geometric axis (10) (FIG. 2) which is at least approximately vertical and extends at least approximately in median vertical plane (11) of body (3), directed in direction of advance (12) during work. The angular position of tongue (4) relative to body (3) can be modified by making tongue (4) pivot around axis (10) of joint (9). Putting the tongue (4) into the desired angular position and holding the tongue (4) in the latter are achieved by a hydraulic cylinder (13). Due to this arrangement, body (3) of mower (1) can, in particular at work, extend—as seen from behind in direction of advance (12) at work—either to the right or to the left of farm tractor (2). This allows the back and forth mowing.

Body (3) of mower (1) comprises a frame (14) which rests on the ground—in particular during work—by two wheels (15) which each extend near a respective outside end of the frame (14). Each wheel (15) is connected to frame (14) by a wheel arm (16) itself connected to the frame (14) by a pivot-type joint (17) with a geometric axis at least approximately horizontal and directed at least approximately perpendicular to direction of advance (12) at work. The geometric axes of joints (17) of the two wheels (15) are at least approximately merged. Between each wheel arm (16) and frame (14) is further provided a hydraulic cylinder (18) which makes it possible to make wheel arm (16) and corresponding wheel (15) pivot relative to frame (14) around the geometric axis of corresponding joint (17). This makes it possible for frame (14) to be brought close to ground (109) during the mowing phase and to be distanced from ground (109) when the mowing is stopped.

Body (3) of mower (1) further comprises a group of working elements which consists of a harvesting mechanism (19) equipped with cutting elements (20) and elements (21) for processing the product cut by cutting elements (20), such as, for example, conditioning elements. This harvesting mechanism (19) is connected to frame (14) by a suspension device (22) which will be described below in more detail.

Driving of harvesting mechanism (19) is achieved from power takeoff (23) of tractor (2) which drives, by a universal joint telescopic shaft (24), the input shaft (not shown) of connecting device (8) which is also, in a way known to one skilled in the art, a transmission device of the movement. Output shaft (25) of connecting and transmission device (8) transmits the movement to a transmission shaft (26) which is housed inside secondary tongue (7). Transmission shaft (26) is coupled to input shaft (27) of an intermediate housing (28) which extends at the level of the connection of secondary tongue (7) to frame (14). This intermediate housing (28) (FIG. 2) consists of two parts: an upper part (29) integral with secondary tongue (7) and a lower part (30) integral with frame (14). Upper part (29) supports, on the one hand, input shaft (27) and, on the other hand, an intermediate output shaft (31). These two shafts (27, 31) are coupled by a bevel gear pair (32) housed in upper part (29). Lower part (30) supports, on the one hand, an intermediate input shaft (33) and, on the other hand, an output shaft (34). The two shafts (33, 34) are connected in rotation by a bevel gear pair (35) housed in lower part (30). Further, intermediate output shaft (31) and intermediate input shaft (33) are coupled to one another by a universal joint (36). Finally, these two intermediate shafts (31, 33) are arranged so that their respective axes of rotation are merged with geometric axis (10) of joint (9) by which tongue (4) is connected to frame (14) of body (3). This joint (9) is made in the following manner. At its rear end, secondary tongue (7) is equipped with a hub (37) centered on geometric axis (10) and extending downward. This hub (37) is guided in rotation in a bearing (38) also centered on geometric axis (10) and integral with frame (14). Guiding in rotation of hub (37) in bearing (38) just as the axial connection of the hub (37) and the bearing (38) have not been detailed, because the latter are within the scope of one skilled in the art. Output shaft (34) of lower part (30) of intermediate housing (28) drives input shaft (39) of input housing (40) of harvesting mechanism (19) by a universal joint telescopic transmission shaft (41).

The shape of frame (14) is illustrated in FIG. 1. The latter essentially consists of a median element (42) and two lateral elements (43, 44) each extending on a respective side of the median element (42). Median element (42) mainly consists of bearing (38) and a bracket (45) which extends forward at least approximately horizontally and at least approximately in direction of advance (12) at work. The bracket (45) is advantageously connected rigidly, but nevertheless in a removable manner, to bearing (38). Lateral elements (43, 44) each consist of a beam (46) extending at least approximately horizontally and crosswise to direction of advance (12) at work. A strut (47) extending downward is attached to the outside end of each beam (46), i.e. the end distant from bearing (38). Wheel arm (16) of corresponding wheel (15) is connected to the lower end of this strut (47). Each lateral element (43, 44) is also connected rigidly and in a removable manner to bearing (38).

Figure 2:
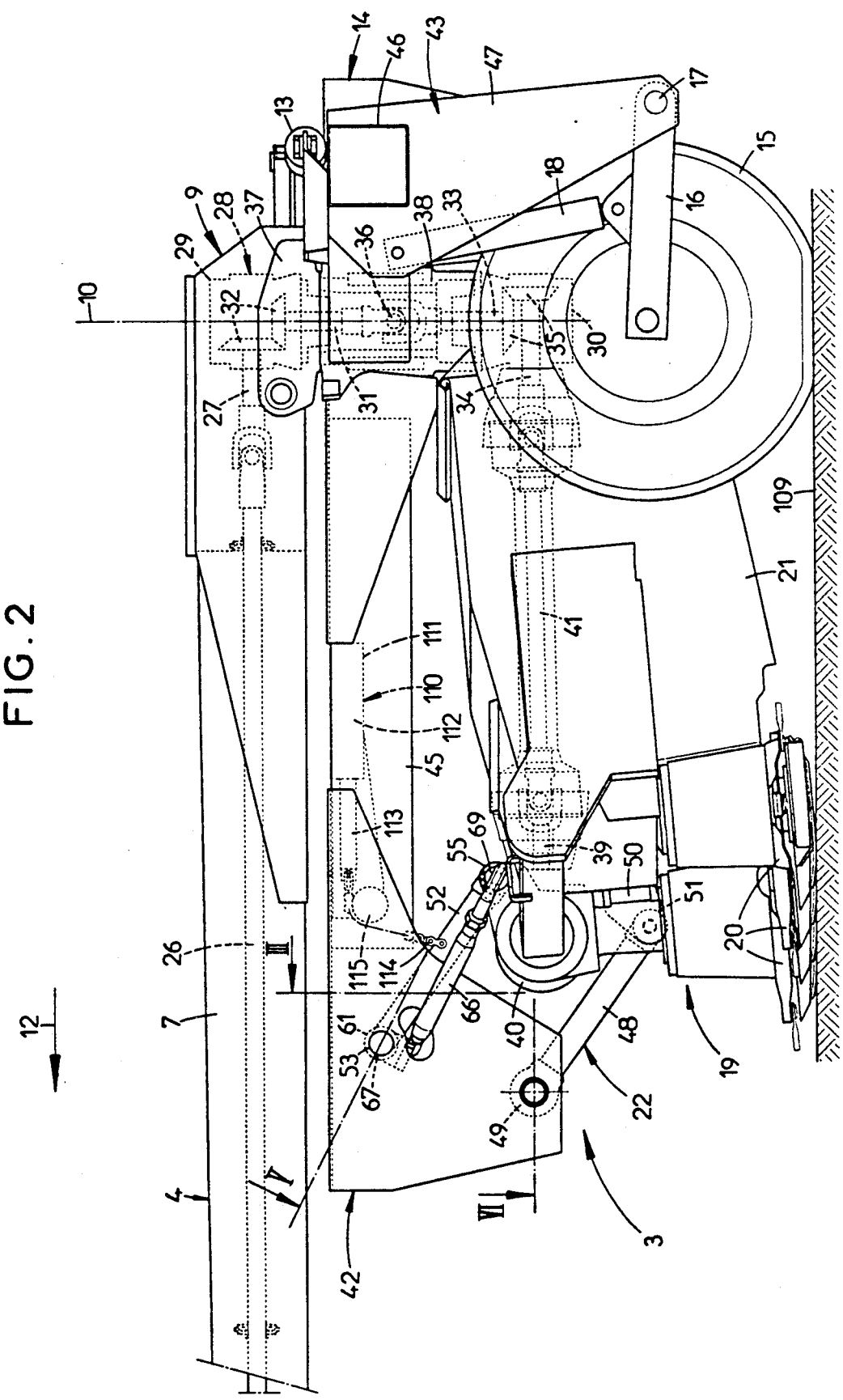
FIG. 2 shows a side view of the body of the machine.

In FIGS. 1 and 2, it further comes out that harvesting mechanism (19) extends crosswise to direction of advance (12) at work, just as under bracket (45) of median element (42) of frame (14), to the front end of which it is connected by suspension device (22).

The structure of this suspension device (22) is illustrated in detail in FIGS. 2 to 6.

The suspension device (22) comprises a first suspension element (48) connected, on the one hand, to bracket (45) of frame (14) by a first joint (49) of the ball joint type, and, on the other hand, to a crossbeam (50) of harvesting mechanism (19) by a second joint (51) also of the ball joint type. As can be seen in FIG. 2 in particular, this second joint (51) extends lower and, taking into account the direction of advance (12) at work, more to the rear than first joint (49).

Figure 5:
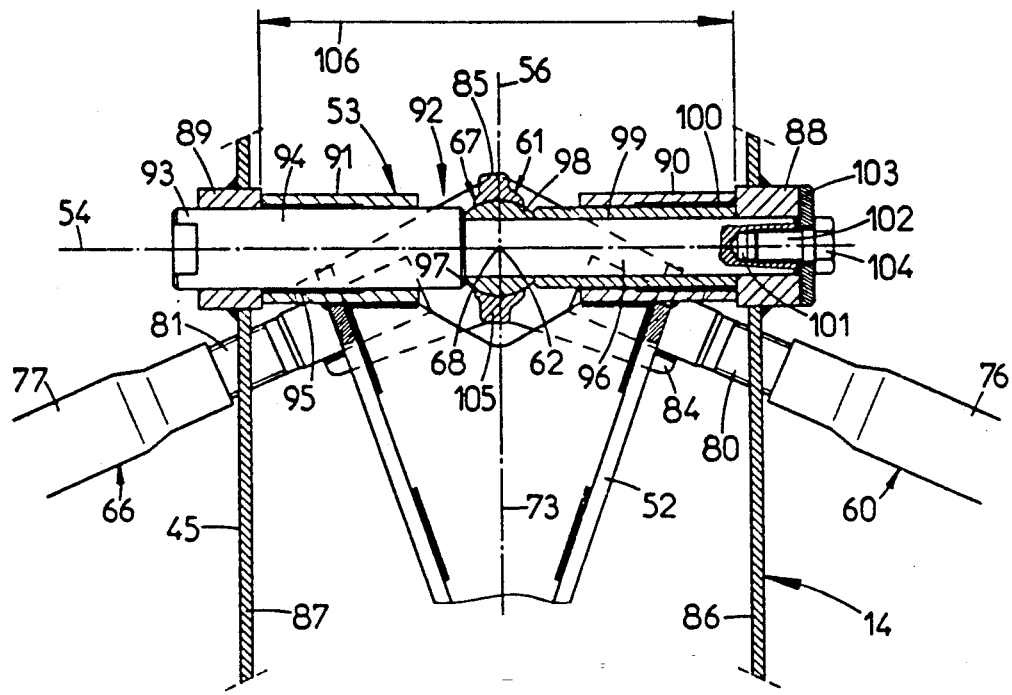
FIG. 5 shows a view in section along plane V defined in FIG. 2.

Suspension device (22) also comprises a second suspension element (52) connected to bracket (45) of frame (14) by a first joint (53) of the cylindrical type with geometric axis (54). As illustrated in FIG. 5, this first joint (53) is of the pivot type, i.e. a cylindrical joint whose translation along its geometric axis is stopped. This second suspension element (52) is further connected to input housing (40) of harvesting mechanism (19) by a second joint (55) of the ball joint type which extends, as can be seen in FIG. 2, lower and taking into account the direction of advance (12) at work, more to the rear than first joint (53). This second suspension element (52) is arranged so that a first plane (56) (FIG. 4) passing through center (57) of its second joint (55) and orthogonal to geometric axis (54) of its first joint (53), contains at least approximately center (58) of first joint (49) of first suspension element (48) and is at least approximately vertical. Geometric axis (54) of first joint (53) of second suspension element (52) is arranged so that at work, first plane (56) is at least approximately directed in direction of advance (12) at work. Here, it is even at least approximately merged with median plane (11) of body (3), respectively of harvesting mechanism (19). This second suspension element (52) further is also arranged so that its first joint (53) extends higher and, taking into account direction of advance (12) at work, more to the rear than first joint (49) of first suspension element (48). Second suspension element (52) thus extends higher than first suspension element (48). This first suspension element (48) is further arranged so that when harvesting mechanism (19) rests on horizontal ground (109), center (59) of its second joint (51) extends at least approximately in first plane (56). Moreover, first joints (49; 53) and second joints (51; 55) of the two suspension elements (48; 52) are arranged so that these two suspension elements (48; 52) form with frame (14) and harvesting mechanism (19) at least approximately a deformable parallelogram in particular in the first plane (56). Further, as first joints (49; 53) extend, taking into account direction of advance (12) at work, more forward than second joints (51; 55), the deformable parallelogram is drawn, which makes it possible for harvesting mechanism (19) to pass well above obstacles.

Suspension device (22) further comprises a first lateral suspension element (60) connected to bracket (45) of frame (14) by a first joint (61) of the ball joint type whose center (62) is at least approximately located on geometric axis (54) of first joint (53) of second suspension element (52) as well as at least approximately in first plane (56). This first lateral suspension element (60) is further connected to harvesting mechanism (19) by a second joint (63) of the ball joint type with center (64).

Suspension device (22) also comprises a second lateral suspension element (66) connected to bracket (45) of frame (14) by a first joint (67) of the ball joint type whose center (68) is at least approximately located on geometric axis (54) of first joint (53) of second suspension element (52) as well as at least approximately in first plane (56). In the preferred example shown, it is actually seen that center (68) of first joint (67) of second lateral suspension element (66) is merged with center (62) of first joint (61) of first lateral suspension element (60). This second lateral suspension element (66) is further connected to harvesting mechanism (19) by a second joint (69) of the ball joint type with center (70).

The two lateral suspension elements (60, 66) are arranged so that centers (64, 70) of their second joints (63, 69), center (57) of second joint (55) of second suspension element (52) and merged centers (62, 68) of first joints (61, 67) of two lateral suspension elements (60, 66) are at least approximately located in a second plane (71) which intersects first plane (56) along a first straight line (72) passing through center (57) of second joint (55) of second suspension element (52) and at least approximately merged centers (62, 68) of first joints (61, 67) of the two lateral suspension elements (60, 66). These two lateral suspension elements (60, 66) are at least approximately symmetrical relative to this first straight line (72). Moreover, centers (64, 70) of second joints (63, 69) of the two lateral suspension elements (60, 66) and center (57) of second joint (55) of second suspension element (52) are at least approximately located on a second straight line (73) which is always at least approximately orthogonal to first straight line (72). When harvesting mechanism (19) rests on horizontal ground (109), second plane (71) is at least approximately orthogonal to first plane (56). In this position, second straight line (73) therefore also extends at least approximately parallel to geometric axis (54) of first joint (53) of second suspension element (52).

In FIG. 1, it is illustrated that second joint (63) of first lateral suspension element (60) extends—mower (1) seen from the rear in direction of advance (12) at work—approximately in the median part of the part of harvesting mechanism (19) extending on the same side of median plane (11) as the first lateral suspension element (60). In other words, second joint (63) of first lateral suspension element (60) extends at a distance of median plane (11) approximately equal to one quarter of work width (65) of harvesting mechanism (19). Likewise, it is illustrated that second joint (69) of second lateral suspension element (66) also extends—mower (1) seen from the rear in direction of advance (12) at work—approximately in the median part of the part of harvesting mechanism (19) extending on the same side of median plane (11) as the second lateral suspension element (66).

Suspension device (22), which has just been described, operates in the following manner.

Harvesting mechanism (19) can be displaced upward or downward relative to frame (14) by deformation of the deformable parallelogram that the two suspension elements (48, 52) form with frame (14) and harvesting mechanism (19).

Harvesting mechanism (19) can then pivot around first straight line (72).

Harvesting mechanism (19) cannot, on the other hand, pivot around straight line (74) passing through center (58) of first joint (49) of first suspension element (48) and merged centers (62, 68) of first joints (61, 67) of the two lateral suspension elements (60, 66). This pivoting is actually stopped by first joint (53) of second suspension element (52) since the latter is of the cylindrical or pivot type. This first joint (53) of second suspension element (52) is therefore a means preventing the displacement of the harvesting mechanism (19) crosswise to direction of advance (12) at work.

Harvesting mechanism (19), finally, cannot pivot around straight line (75) passing through centers (59, 57) of second joints (51, 55) of two suspension elements (48, 52). This pivoting is actually stopped by the two lateral suspension elements (60, 66).

Figure 3:
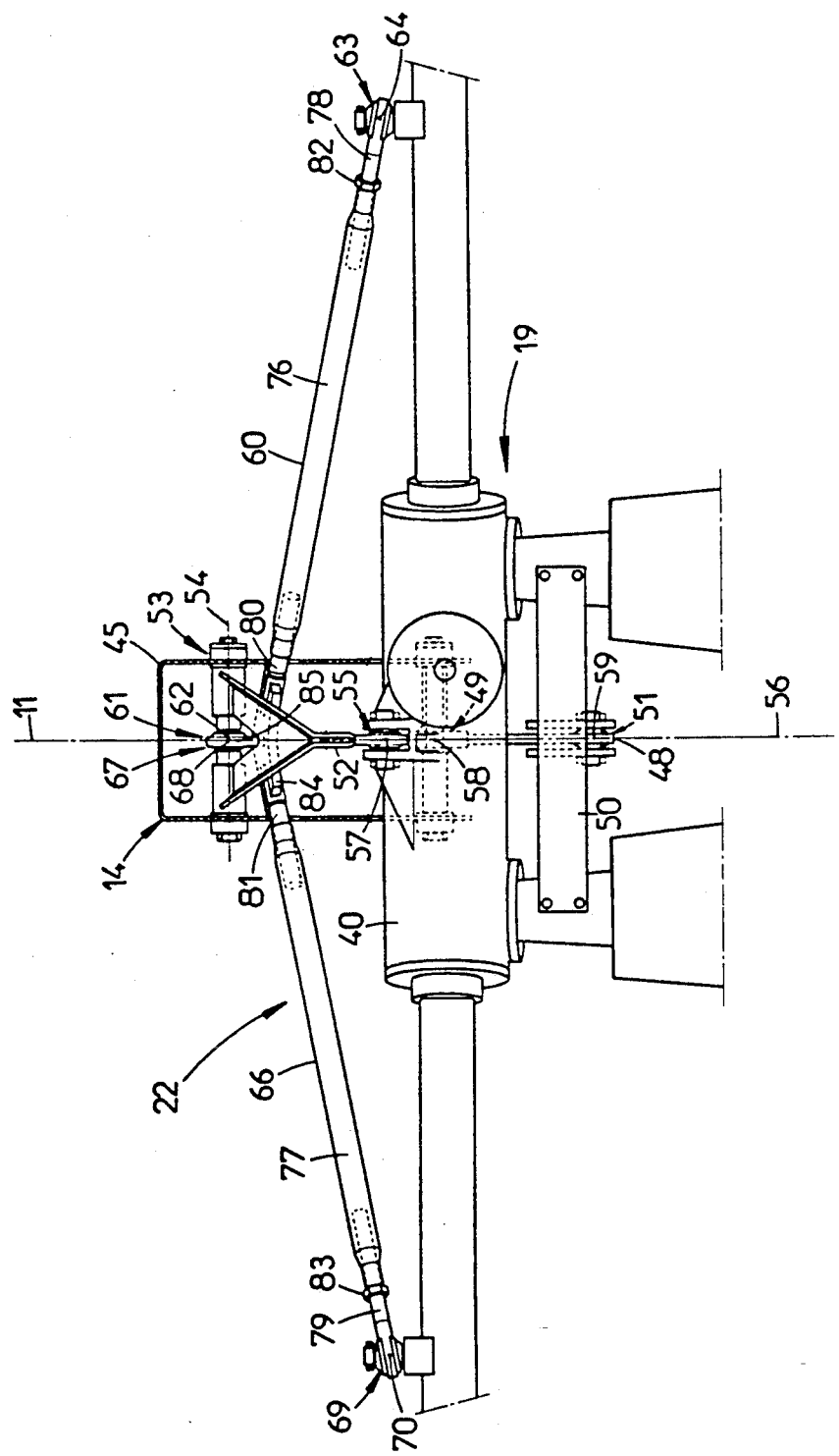
FIG. 3 shows a view along III defined in FIG. 2 (only the frame has been sectioned)
Figure 4:
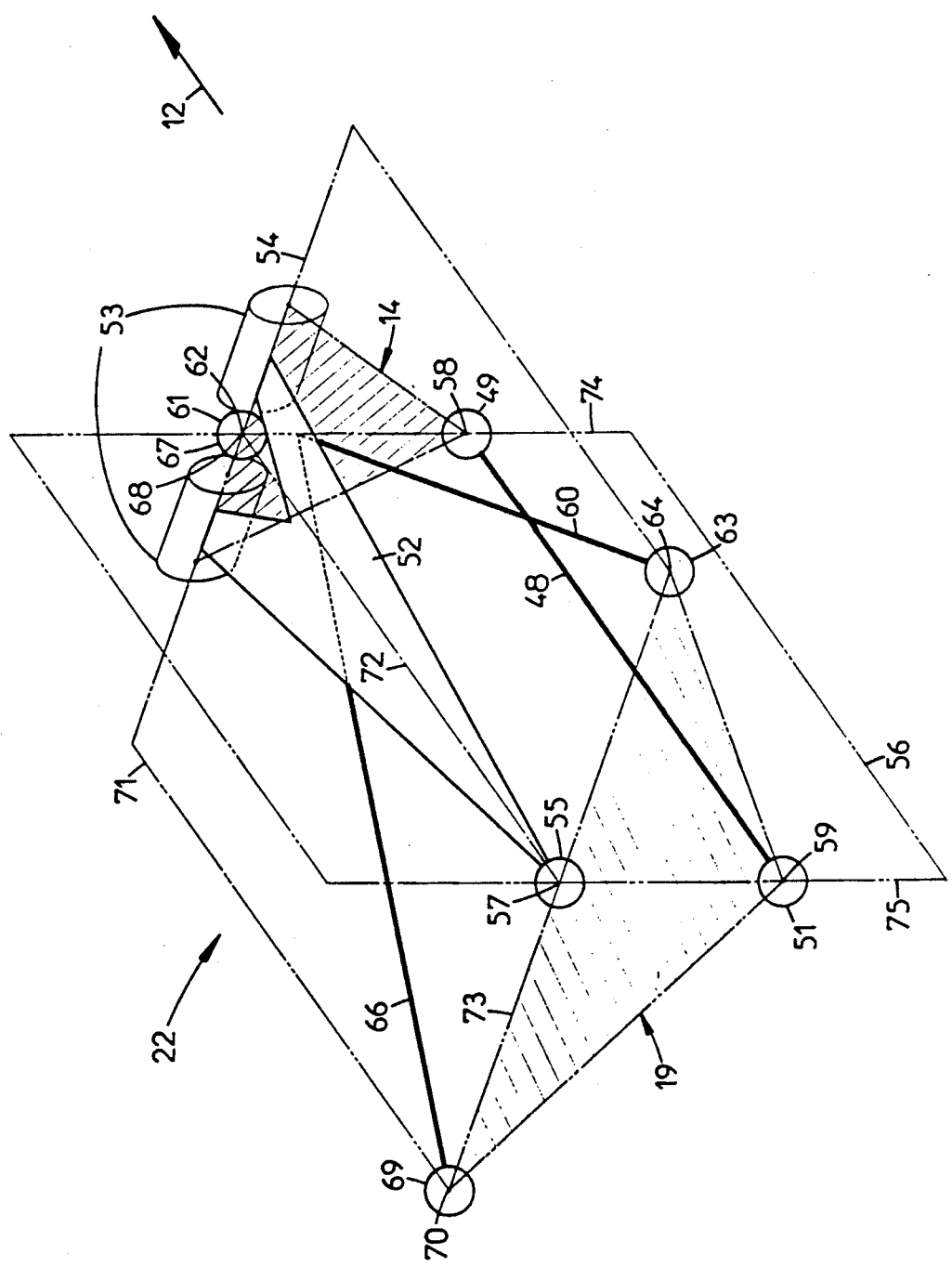
FIG. 4 shows a diagrammatic perspective view of the suspension device.

The two suspension elements (48, 52) and two lateral suspension elements (60, 66), constituting suspension device (22), are each formed by a rigid connecting rod. In FIG. 3 in particular, it is illustrated that the two lateral suspension elements (60, 66) each comprise in particular a body (76, 77) of which one of the ends is equipped with a longitudinal threaded hole having a right-handed thread and of which the other end is equipped with a longitudinal threaded hole having a left-handed thread. In one of these threaded holes is screwed a suitable threaded rod (78, 79), while in the other threaded hole is also screwed a suitable threaded rod (80, 81). By thus rotating body (76, 77) in one direction or in the other, the length of lateral suspension element (60, 66) is elongated or shortened. When the desired length is reached, the rotation of body (76, 77) is stopped relative to threaded rods (78, 80, 79, 81) by a nut (82, 83) screwed onto threaded rod (78, 79) to strike against the corresponding end of body (76, 77). Accordingly, it is possible to correctly adjust the length of each lateral suspension element (60, 66). Additionally, it is also possible to prestress each lateral suspension element (60, 66).

As stated above, first joint (61) of first lateral suspension element (60) and first joint (67) of second lateral suspension element (66) are merged. For this purpose, threaded rods (80, 81) of these lateral suspension elements (60, 66) are connected rigidly to one another by a connecting plate (84) which extends under first joint (53) of second suspension element (52). In its median part, the connecting plate (84) is equipped with a ball joint (85) intended to form both first joint (61) of first lateral suspension element (60) and first joint (67) of second lateral suspension element (66).

The particular arrangement of first joint (53) of second suspension element (52), of first joint (61) of first lateral suspension element (60) and of first joint (67) of second lateral suspension element (66) is illustrated in detail in FIG. 5.

In each of two flanges (86, 87) of bracket (45) of frame (14) is welded a ring (88, 89) so that these two rings (88, 89) define geometric axis (54) of first joint (53) of second suspension element (52). The latter comprises two cylindrical bearing surfaces (90, 91) extending at least approximately symmetrically relative to first plane (56) and between which is provided a certain space (92) making it possible for ball joint (85) to be extended between the cylindrical bearing surfaces (90, 91). A journal (93) comprises a first part (94) having a diameter corresponding to the inside diameter of ring (89) of flange (87) of bracket (45) in which the first part (94) is housed. Moreover, this first part (94) also goes through cylindrical bearing surface (91) of second suspension element (52), which is guided in rotation on the first part (94) by a guide ring (95). Journal (93) then comprises a second part (96) with a smaller diameter than the diameter of first part (94) to form a shoulder (97) extending in space (92) provided between two cylindrical bearing surfaces (90, 91) of second suspension element (52). The diameter of second part (96) corresponds to the inside diameter of ring (88) of flange (86) of bracket (45), in which the second part (96) is housed. The diameter of the second part (96) also corresponds to the inside diameter of sphere (98) of ball joint (85). Sphere (98) of ball joint (85) is mounted on second part (96) to be extended between shoulder (97) and a liner (99) slid over second part (96) and extending between the sphere (98) and ring (88). The outside diameter of this liner (99) corresponds to the diameter of first part (94) of journal (93). In addition, this liner (99) goes through cylindrical bearing surface (90) which is guided in rotation on the liner (99) by a guide ring (100). In the end of second part (96) of journal (93), which is housed in ring (88), a threaded hole (101) is made along the longitudinal axis of journal (93). In this threaded hole (101) is screwed a bolt (102) which also goes through a support washer (103) extending between head (104) of bolt (102) and ring (88). By tightening bolt (102), support washer (103) rests on ring (88), which has the effect of displacing journal (93) in the direction of the ring (88). The displacement of journal (93) will be stopped when shoulder (97) strikes sphere (98) which strikes liner (99) which strikes ring (88). Sphere (98) thus is locked and body (105) of ball joint (85) can pivot on the latter for the formation of first joints (61, 67) of two lateral suspension elements (60, 66). The outside distance between the two cylindrical bearing surfaces (90, 91) is somewhat less than inside distance (106) between the two rings (88, 89). In this way, the cylindrical bearing surfaces (90, 91) can pivot on first part (94) of journal (93), respectively on liner (99), for the formation of first joint (53) of second suspension element (52).

Figure 6:
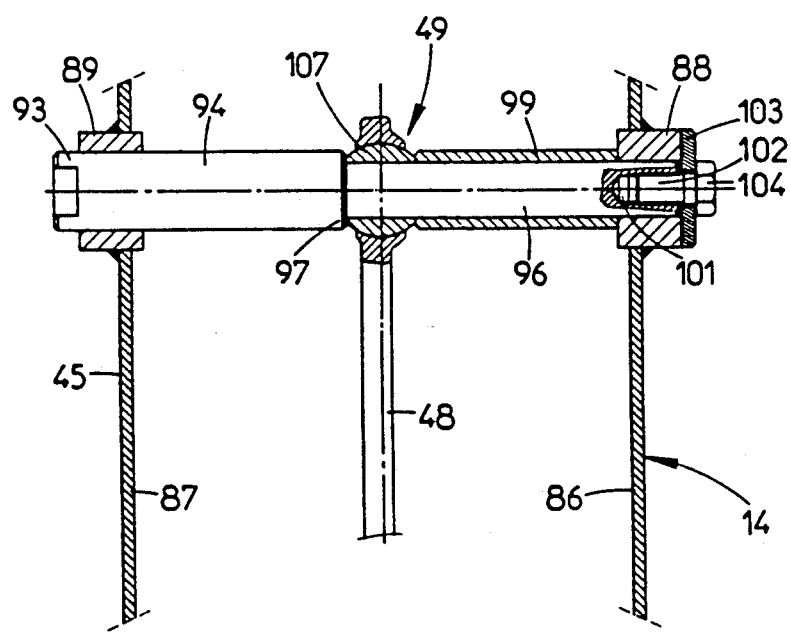
FIG. 6 shows a view in section along plane VI defined in FIG. 2.

The arrangement of first joint (49) of first suspension element (48) is illustrated in detail in FIG. 6. It is unnecessary to describe it, however, since ball joint (107), intended to form the first joint (49), is mounted in the same manner as ball joint (85) forming first joints (61, 67) of the two lateral suspension elements (60, 66), the mounting which has been described above.

As can be seen in FIG. 2, mower (1) also comprises a lifting device (110) of harvesting mechanism (19). This device comprises a hydraulic cylinder (111) whose cylinder (112) is connected to frame (14) and whose rod (113) is connected to a chain (114). This chain (114) is wound partially on a wheel (115) guided in rotation in frame (14) and is connected at its end distant from hydraulic cylinder (111) to second suspension element (52). During work, this lifting device (110) does not interfere with the displacement of harvesting mechanism (19) relative to frame (14). When the harvesting mechanism (19) is to be lifted, it will be sufficient to make rod (113) return to body (112) of hydraulic cylinder (111) by injecting fluid into the latter. By so doing, rod (113) pulls, via chain (114), on second suspension element (52), which has the effect of making harvesting mechanism (19) rise by deformation of the deformable parallelogram.

Figure 7:
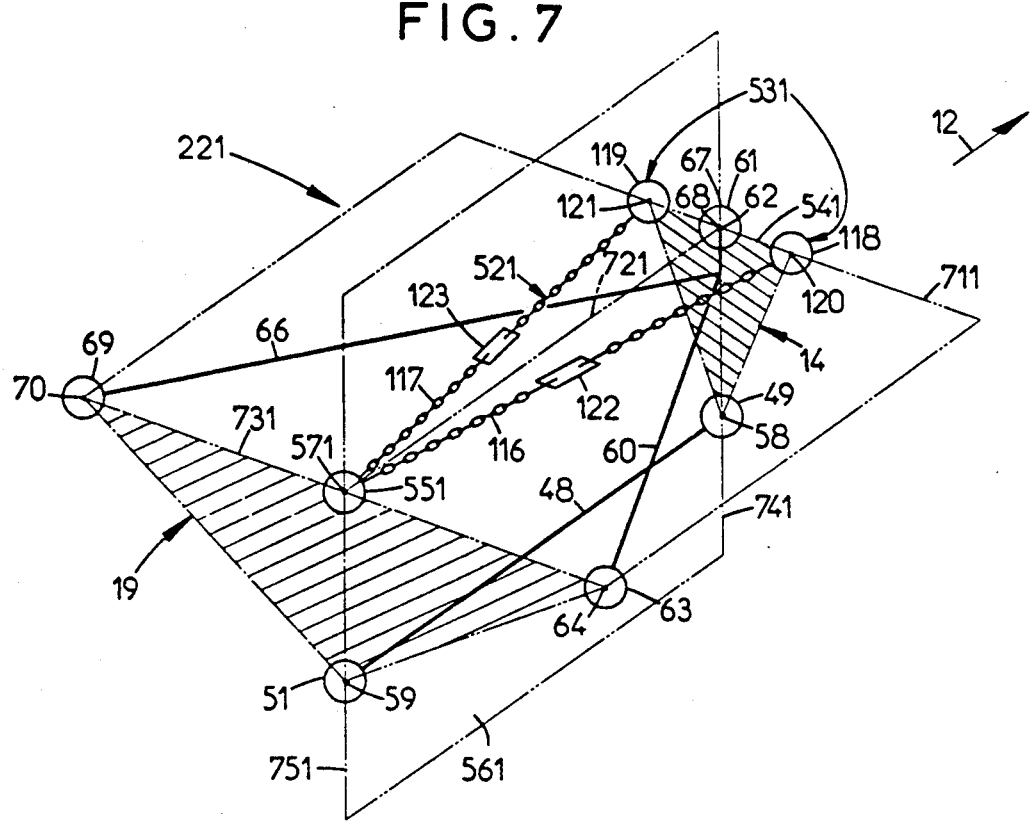
FIGS. 7 to 10 show a diagrammatic perspective view of other embodiments of the suspension device.

FIG. 7 diagrammatically shows another embodiment of a suspension device (221).

The latter comprises a first suspension element (48) identical with first suspension element (48) of suspension device (22).

It then comprises a second suspension element (521). The latter consists of two elements (116, 117) each of which is connected to frame (14) by a first joint (118, 119) of the ball joint type and which are connected to harvesting mechanism (19) by a second common joint (551) of the ball joint type. The two first joints (118, 119) of the two elements (116, 117) form first joint (531) by which second suspension element (521) is connected to frame (14). This first joint (531) is equivalent to a joint of the pivot type, whose axis (541) consists of the straight line passing through centers (120, 121) of first joints (118, 119) of two elements (116, 117). This second suspension element (521) is arranged so that a first plane (561), passing through center (571) of its second joint (551) and orthogonal to geometric axis (541) of its first joint (531), contains at least approximately center (58) of first joint (49) of first suspension element (48) and is at least approximately vertical. This first plane (561) further constitutes, at least approximately, the bisecting plane of the angle formed by the two elements (116, 117) of second suspension element (521).

Geometric axis (541) of first joint (531) of second suspension element (521) can be arranged so that at work, first plane (561) is at least approximately directed in direction of advance (12) at work. It can also be provided that first plane (561) is at least approximately merged with median plane (11). Moreover, first suspension element (48) is arranged so that when harvesting mechanism (19) rests on horizontal ground (109), center (59) of its second joint (51) extends at least approximately in first plane (561).

The relative position between first joints (49, 531) and second joints (51, 551) of the two suspension elements (48, 521) is similar to that of the first joints (49, 53) and the second joints (51, 55) of the two suspension elements (48, 52) of suspension device (22). Thus, the two suspension elements (48, 521) also form with frame (14) and harvesting mechanism (19) at least approximately a drawn parallelogram.

Suspension device (221) also comprises two lateral suspension elements (60, 66) identical with those of suspension device (22). Merged centers (62, 68) of their first joints (61, 67) are at least approximately located on geometric axis (541), as well as at least approximately in the first plane (561). Moreover, centers (64, 70) of their second joints (63, 69), center (571) of second joint (551) of second suspension element (521) and merged centers (62, 68) of first joints (61, 67) of the two lateral suspension elements (60, 66) are at least approximately located in a second plane (711) which intersects first plane (561) along a first straight line (721) passing through center (571) of second joint (551) of second suspension element (521) and centers at least approximately merged (62, 68) of first joints (61, 67) of the two lateral suspension elements (60, 66). The latter are at least approximately symmetrical relative to this first straight line (721). Moreover, centers (64, 70) of second joints (63, 69) of the two lateral suspension elements (60, 66) and center (571) of the second joint (551) of second suspension element (521) are at least approximately located on a second straight line (731) which is always at least approximately orthogonal to first straight line (721). When harvesting mechanism (19) rests on horizontal ground (109), second plane (711) is at least approximately orthogonal to first plane (561). In this position, second straight line (731) therefore also extends at least approximately parallel to geometric axis (541) of first joint (531) of second suspension element (521).

In this example, it is further provided that the relative position of second joints (63, 69) of the two lateral suspension elements (60, 66) on harvesting mechanism (19) is similar to that of second joints (63, 69) of the two lateral suspension elements (60, 66) of the suspension device (22).

It is provided, moreover, that the two elements (116, 117) of second suspension element (521) each are formed by a chain. The latter are also each equipped with an element for adjusting (122, 123) the distance separating center (120, 121) from their first joint (118, 119) and center (571) from their second common joint (551). Adjusting elements (122, 123) are mainly used to prestress elements (116, 117).

This suspension device (221) operates in the following manner.

Harvesting mechanism (19) can be displaced upward and downward relative to frame (14) by deformation of the deformable parallelogram that the two suspension elements (48, 521) form with frame (14) and harvesting mechanism (19).

Harvesting mechanism (19) then can pivot around first straight line (721).

Harvesting mechanism (19) cannot, on the other hand, pivot around straight line (741) passing through center (58) of first joint (49) of first suspension element (48) and merged centers (62, 68) of first joints (61, 67) of two lateral suspension elements (60, 66). This pivoting is actually stopped by first joint (531) of second suspension element (521), since the latter is of the pivot type. This first joint (531) is therefore, like first joint (53), a means preventing the displacement of harvesting mechanism (19) in a direction crosswise to direction of advance (12) at work.

Harvesting mechanism (19), finally, cannot pivot around straight line (751) passing through centers (59, 571) of second joints (51, 551) of the two suspension elements (48, 521) either. This pivoting is actually stopped by the two lateral suspension elements (60, 66).

Figure 8:
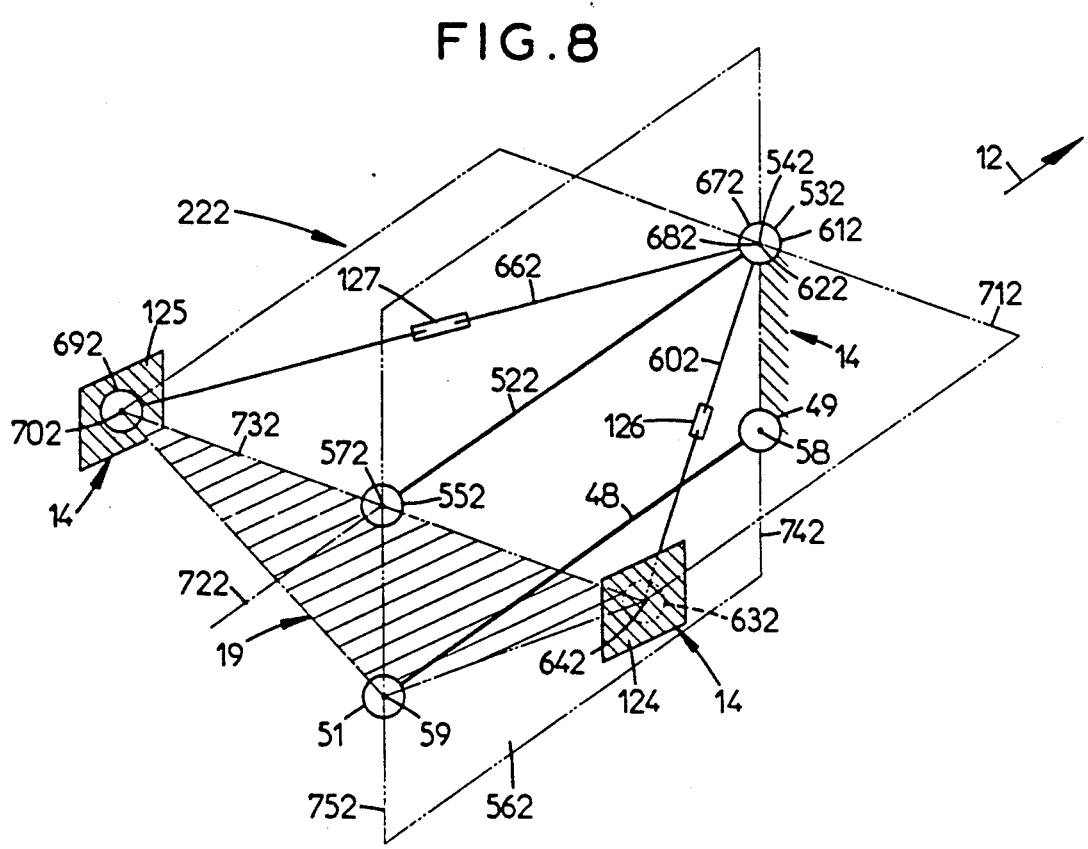

FIG. 8 diagrammatically shows another embodiment of a suspension device (222).

The latter first of all comprises a first suspension element (48) identical with that of suspension device (22).

It then comprises a second suspension element (522) connected, on the one hand, to frame (14) by a first joint (532) of the ball joint type and, on the other hand, to harvesting mechanism (19) by a second joint (522) also of the ball joint type. This second suspension element (522) is arranged so that center (542) of its first joint (532) and center (572) of its second joint (552) are located in a first plane (562) at least approximately vertical and passing through center (58) of first joint (49) of first suspension element (48). This first suspension element (48) is further arranged so that when harvesting mechanism (19) rests on horizontal ground (109), center (59) of its second joint (51) extends at least approximately in first plane (562).

The relative position between first joints (49, 532) and second joints (51, 552) of the two suspension elements (48, 522) is similar to that of the first joints (49, 53) and second joints (51, 55) of the two suspension elements (48, 52) of suspension device (22). Thus, the two suspension elements (48, 522) also form with frame (14) and harvesting mechanisms (19) at least approximately a drawn deformable parallelogram.

Suspension device (222) then comprises a first lateral suspension element (602) connected, on the one hand, to frame (14) by a first joint (612) of the ball joint type, whose center (622) is at least approximately merged with center (542) of first joint (532) of second suspension element (522), and, on the other hand, to harvesting mechanism (19) by a second joint (632) also of the ball joint type.

Suspension device (222) also comprises a second lateral suspension element (662) connected to frame (14) by a first joint (672) of the ball joint type, whose center (682) is also at least approximately merged with center (542) of first joint (532) of second suspension element (522). This second lateral suspension element (662) is, on the other hand, connected to harvesting mechanism (19) by a second joint (692) also of the ball joint type.

In the example shown, it is actually seen that center (542) of first joint (532) of second suspension element (522) and centers (622, 682) of first joints (612, 672) of the two lateral suspension elements (602, 662) are merged. Moreover, centers (642, 702) of second joints (632, 692) of the two lateral suspension elements (602, 662), center (572) of second joint (552) of second suspension element (522) and merged centers (622, 682, 542) of first joints (612, 672, 532) of the two lateral suspension elements (602, 662) and of second suspension element (522) are at least approximately located in a second plane (712) which intersects first plane (562) along a first straight line (722) passing through center (572) of second joint (552) of second suspension element (522) and centers at least approximately merged (622, 682, 542) of first joints (612, 672, 532) of two lateral suspension elements (602, 662), respectively of second suspension element (522). The two lateral suspension elements (602, 662) are at least approximately symmetrical relative to this first straight line (722). Moreover, centers (642, 702) of second joints (632 692) of the two lateral suspension elements (602, 662) and center (572) of second joint (552) of second suspension element (522) are at least approximately located on a second straight line (732) which is always at least approximately orthogonal to first straight line (722). When harvesting mechanism (19) rests on horizontal ground (109), second plane (712) is at least approximately orthogonal to first plane (562).

The position of plane (562) relative to direction of advance (12) at work is defined by stops (124, 125) integral with frame (14) and acting on the unit formed by second suspension element (522) and two lateral suspension elements (602, 662) or on harvesting mechanism (19). These stops (124, 125) can be arranged so that at work, first plane (562) is at least approximately directed in direction of advance (12) at work. It can also be provided that first plane (562) is, like first plane (56) of suspension device (22), at least approximately merged with median plane (11).

In this example, it is further provided that second suspension element (522) is also formed by a rigid connecting rod. The two lateral suspension elements (602, 662), on the other hand, are each formed by a cable. It comes out, moreover, that these lateral suspension elements (602, 662) are each equipped with an element for adjusting (126, 127) the distance separating center (622, 682) of their first joint (612, 672) and center (642, 702) of their second joint (632, 692). These adjusting elements (126, 127) are used in particular to prestress lateral suspension elements (602, 662).

In this example, it is finally also provided that the relative position of second joints (632, 692) of the two lateral suspension elements (602, 662) on harvesting mechanism (19) is similar to that of second joints (63, 69) of the two lateral suspension elements (60, 66) of suspension device (22).

This suspension device (222) operates in the following manner.

Harvesting mechanism (19) can be displaced upward and downward relative to frame (14) by deformation of the deformable parallelogram that the two suspension elements (48, 522) form with frame (14) and harvesting mechanism (19).

Harvesting mechanism (19) then can pivot around first straight line (722).

Harvesting mechanism (19) cannot, however, pivot or at the very least in a certain predetermined limit around straight line (742) passing through center (58) of first joint (49) of first suspension element (48) and merged centers (542, 622, 682) of first joints (532, 612, 672) of second suspension element (522) and of the two lateral suspension elements (602, 662). This pivoting is actually stopped or at least limited by stops (124, 125) which are therefore a means preventing or limiting the displacement of harvesting mechanism (19) in a direction crosswise to direction of advance (12) at work.

Harvesting mechanism (19), finally, cannot pivot around straight line (752) passing through centers (59, 572) of second joints (51, 552) of the two suspension elements (48, 522) either. This pivoting is actually stopped by two lateral suspension elements (602, 662).

Figure 9:
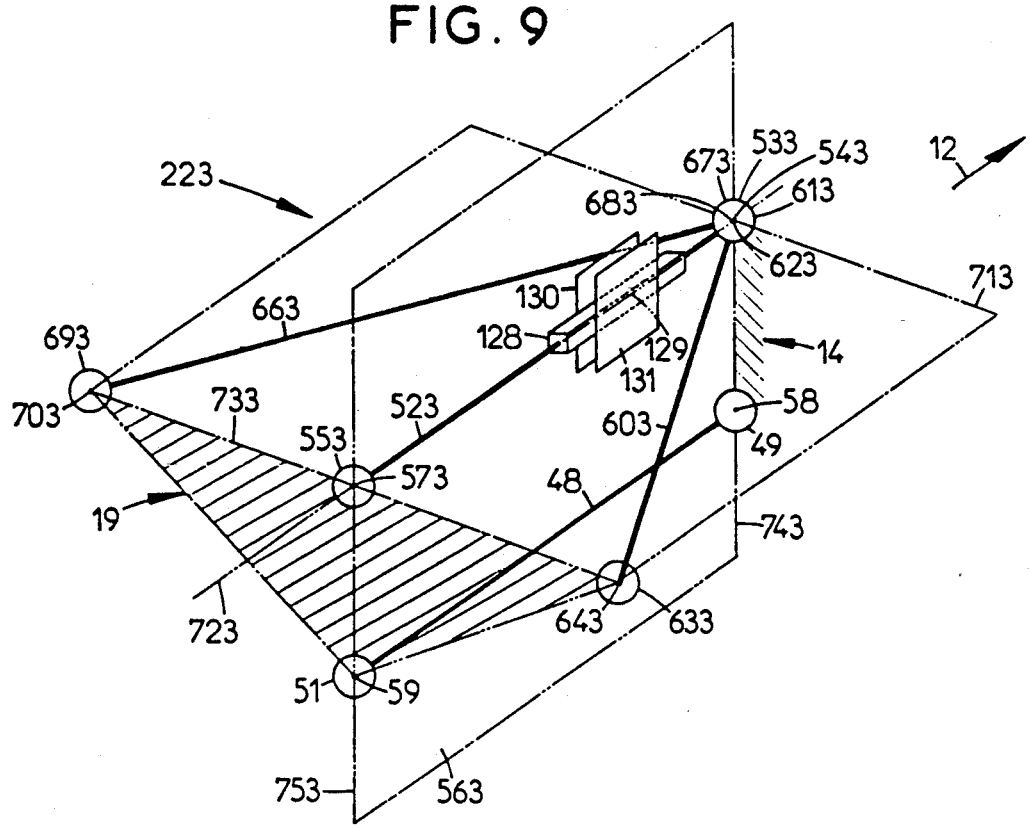

FIG. 9 diagrammatically shows another embodiment of a suspension device (223).

This suspension device (223) first of all comprises a suspension element (48) identical with first suspension element (48) of suspension device (22).

It then comprises a second suspension element (523) connected, on the one hand, to frame (14) by a first joint (533) of the ball joint type and, on the other hand, to harvesting mechanism (19) by a second joint (553) also of the ball joint type. This second suspension element (523) is arranged so that center (543) of its first joint (533) and center (573) of its second joint (553) are located in a first plane (563) at least approximately vertical and passing through center (58) of first joint (49) of first suspension element (48). This first suspension element (48) is further arranged so that when harvesting mechanism (19) rests on horizontal ground (109), center (59) of its second joint (51) extends at least approximately in first plane (563).

The relative position between first joints (49, 533) and second joints (51, 553) of two suspension elements (48, 523) is similar to that of first joints (49, 53) and second joints (51, 55) of the two suspension elements (48, 52) of suspension device (22). Thus, the two suspension elements (48, 523) also form with frame (14) and harvesting mechanism (19) at least approximately a drawn deformable parallelogram.

Suspension device (223) thus comprises a first lateral suspension element (603) connected, on the one hand, to frame (14) by a first joint (613) of the ball joint type, whose center (623) is at least approximately merged with center (543) of first joint (533) of second suspension element (523), and, on the other hand, to harvesting mechanism (19) by a second joint (633) also of the ball joint type.

Suspension device (223) then also comprises a second lateral suspension element (663) connected to frame (14) by a first joint (673) of the ball joint type, whose center (683) is also at least approximately merged with center (543) of first joint (533) of second suspension element (523). This second lateral suspension element (663) is, on the other hand, connected to harvesting mechanism (19) by a second joint (693) also of the ball joint type.

In the example shown, it is actually seen that center (543) of first joint (533) of second suspension element (523) and centers (623, 683) of first joints (613, 673) of the two lateral suspension elements (603, 663) are merged. Moreover, centers (643, 703) of second joints (633, 693) of the two lateral suspension elements (603, 663), center (573) of second joint (553) of second suspension element (523) and merged centers (623, 683, 543) of first joints (613, 673, 533) of the two lateral suspension elements (603, 663) and of second suspension element (523) are at least approximately located in a second plane (713) which intersects first plane (563) along a first straight line (723) passing through center (573) of second joint (553) of second suspension element (523) and centers at least approximately merged (623, 683, 543) of first joints (613, 673, 533) of the two lateral suspension elements (603, 663), respectively of second suspension element (523). The two lateral suspension elements (603, 663) are at least approximately symmetrical relative to this first straight line (723). Moreover, centers (643, 703) of second joints (633, 693) of the two lateral suspension elements (603, 663) and center (573) of second joint (553) of second suspension element (523) are at least approximately located on a second straight line (733) which is always at least approximately orthogonal to first straight line (723). When harvesting mechanism (19) rests on horizontal ground (109), second plane (713) is at least approximately orthogonal to first plane (563).

Between its first joint (533) and its second joint (553), second suspension element (523) is equipped with an element (128) with an at least approximately square section, which extends practically without play between two guide surfaces (130, 131) integral with frame (14). These two guide surfaces (130, 131) are at least approximately plane and extend at least approximately parallel to first plane (563). They thus make it possible for the element (128) to be displaced in first plane (563). These guide surfaces (130, 131) can be arranged so that during work, first plane (563) is at least approximately directed in direction of advance (12) at work. It can also be provided that first plane (563) is, like first plane (56) of suspension device (22), at least approximately merged with median plane (11).

In this example, it is provided that second suspension element (523) just as the two lateral suspension elements (603, 663) are rigid. Although this is not shown, it will be understood that these lateral suspension elements (603, 663) can comprise adjusting elements similar to those of lateral suspension elements (60, 66).

In this example, it is finally also provided that the relative position of second joints (633, 693) of the two lateral suspension elements (603, 663) on harvesting mechanism (19) is similar to that of second joints (63, 69) of the two lateral suspension elements (60, 66).

This suspension device (223) operates in the following manner.

Harvesting mechanism (19) can be displaced upward and downward relative to frame (14) by deformation of the deformable parallelogram that two suspension elements (48, 523) form with frame (14) and harvesting mechanism (19).

Harvesting mechanism (19) can then pivot around first straight line (723).

Harvesting mechanism (19), however, cannot pivot or at the very least in a certain predetermined limit (if a play has been provided between element (128) and guide surfaces (130, 131)) around straight line (743) passing through center (58) of first joint (49) of first suspension element (48) and merged centers (543, 623, 683) of first joints (533, 613, 673) of second suspension element (523) and two lateral suspension elements (603, 663). This pivoting is actually stopped or at least limited by element (128) and two guide surfaces (130, 131) which therefore constitute a means preventing or limiting the displacement of harvesting mechanism (19) in a direction crosswise to direction of advance (12) at work.

Harvesting mechanism (19), finally, can no longer pivot around straight line (753) passing through centers (59, 573) of second joints (51, 553) of the two suspension elements (48, 523). This pivoting is actually stopped by the two lateral suspension elements (603, 663).

Figure 10:
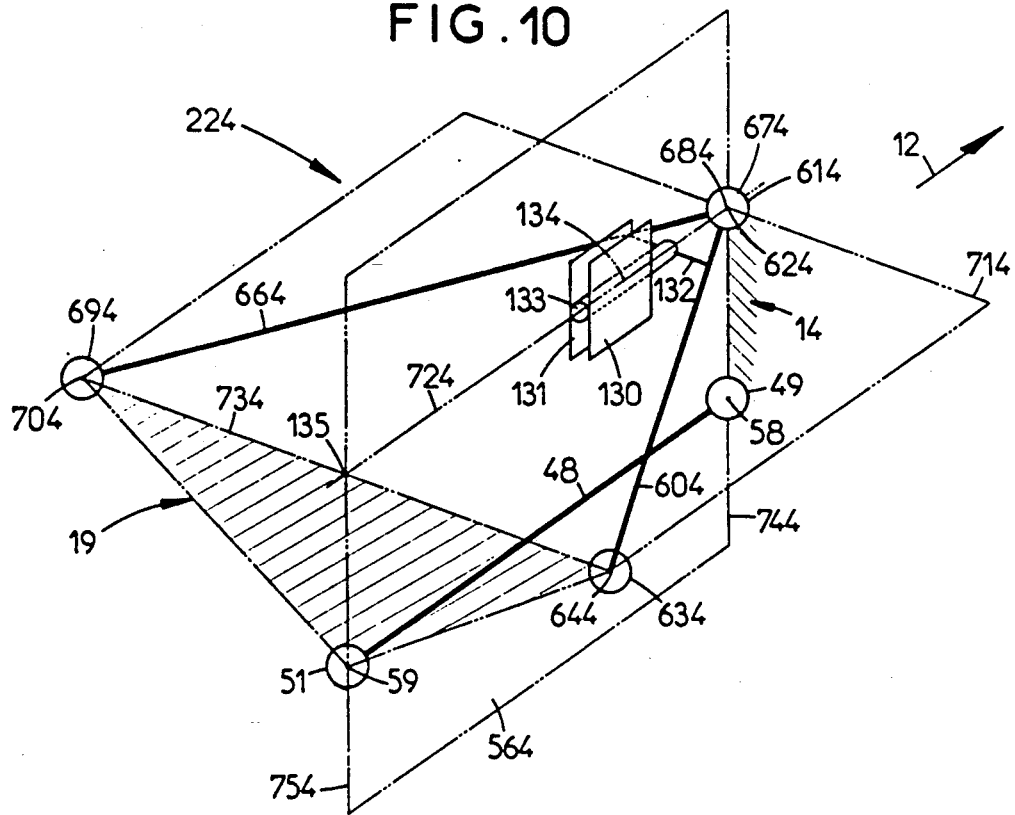

FIG. 10 diagrammatically shows another embodiment of a suspension device (224).

This suspension device (224) first of all comprises a suspension element (48) identical with first suspension element (48) of suspension device (22).

Suspension device (224) then comprises a first lateral suspension element (604) connected, on the one hand, to frame (14) by a first joint (614) of the ball joint type and, on the other hand, to harvesting mechanism (19) by a second joint (634) also of the ball joint type.

Suspension device (224) then also comprises a second lateral suspension element (664) connected, on the one hand, to frame (14) by a first joint (674) of the ball joint type and, on the other hand, to harvesting mechanism (19) by a second joint (694) also of the ball joint type. In the example shown, it is actually seen that centers (624, 684) of first joints (614, 674) of the two lateral suspension elements (604, 664) are at least approximately merged. Near the latter, two lateral suspension elements (604, 664) are connected to one another by a crossbeam (132). The latter carries a cylindrical pin (133) whose longitudinal axis (134) passes at least approximately through at least approximately merged centers (624, 684) of first joints (614, 674) of the two lateral suspension elements (604, 664). Longitudinal axis (134) of this cylindrical pin (133) thus forms an at least approximately vertical first plane (564) with center (58) of first joint (49) of suspension element (48). Suspension element (48) is arranged, moreover, so that when harvesting mechanism (19) rests on horizontal ground (109), center (59) of its second joint (51) also extends at least approximately in first plane (564).

Moreover, centers (644, 704) of second joints (634, 694) and merged centers (624, 684) of first joints (614, 674) of two lateral suspension elements (604, 664) are located in a second plane (714) which intersects first plane (564) along a first straight line (724) at least approximately merged with longitudinal axis (134) of cylindrical pin (133). Two lateral suspension elements (604, 664) are at least approximately symmetrical relative to this first straight line (724). Moreover, centers (644, 704) of second joints (634, 694) of the two lateral suspension elements (604, 664) are located on a second straight line (734) which is always at least approximately orthogonal to first straight line (724). When harvesting mechanism (19) rests on horizontal ground (109), second plane (714) is at least approximately orthogonal to first plane (564).

The position of first plane (564) relative to the direction of advance (12) at work is defined by two guide surfaces (130, 131) identical with those of suspension device (223) and between which cylindrical pin (133) extends. The latter therefore makes it possible for the cylindrical pin (133) to be displaced in plane (564) and to pivot around its longitudinal axis (134), i.e. around first straight line (724). These guide surfaces (130, 131) can be arranged so that at work, first plane (564) is at least approximately directed in direction of advance (12) at work. It can also be provided that first plane (564) is, like first plane (56) of suspension device (22), at least approximately merged with median plane (11).

The relative position between first joints (49, 614, 674) and second joints (51, 634, 694) of suspension element (48), respectively two lateral suspension elements (604, 664), is identical with that of first joints (49, 61, 67) and second joints (51, 63, 69) and suspension element (48), respectively two lateral suspension elements (60, 66) of suspension device (22). Suspension element (48) and two lateral suspension elements (604, 664) thus form a drawn parallelogram with frame (14) and harvesting mechanism (19).

In this example, it is provided that two lateral suspension elements (604, 664) are rigid. Although this is not shown, it will be understood that these lateral suspension elements (604, 664) can comprise adjusting elements similar to those of lateral suspension elements (60, 66).

Suspension device (224) operates in the following manner.

Harvesting mechanism (19) can be displaced upward and downward relative to frame (14) by deformation of the deformable parallelogram defined above.

Harvesting mechanism (19) can then pivot around first straight line (724).

Harvesting mechanism (19), however, cannot pivot or at the very least in a certain predetermined limit around straight line (744) passing through center (58) of first joint (49) of suspension element (48) and merged centers (624, 684) of first joints (614, 674) of the two lateral suspension elements (604, 664). This pivoting is actually stopped or at least limited by cylindrical pin (133) and the two guide surfaces (130, 131) which therefore constitute a means preventing or limiting the displacement of harvesting mechanism (19) in a direction crosswise to direction of advance (12) at work.

Harvesting mechanism (19) cannot pivot around straight line (754) passing through center (59) of second joint (51) of suspension element (48) and point of intersection (135) of first straight line (724) and of second straight line (734) either. This pivoting is actually stopped by the two lateral suspension elements (604, 664).

Various modifications are possible, in particular concerning the composition of various elements or by substitution of equivalent techniques, without thereby going outside the field of protection defined by the claims.

Thus, in particular in the various embodiments described, it is perfectly possible to provide more than two lateral suspension elements, since their first joints are at least approximately merged and their second joints are at least approximately located on the second straight line.

In suspension devices (22; 223), moreover, it would be perfectly possible to provide only a single lateral suspension element or several lateral suspension elements extending on the same side of first straight line (72; 723).

In suspension devices (22; 223), at least one of lateral suspension elements (60, 66; 603, 663) can be replaced by one of lateral suspension elements (602, 662) of suspension device (222) and vice versa.

Moreover, joint (53) of second suspension element (52) of suspension device (22) can be replaced by joint (531) of second suspension element (521) of suspension device (221) and vice versa.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A farm machine which is movable in a direction of work, comprising:

at least one group of working elements and a structure comprising a hitching means for hitching said farm machine to a motor vehicle during work, said at least one group of working elements being connected to said structure through a suspension device defining a deformable quadrilateral, wherein said suspension device comprises:

first and second suspension elements each one of which is connected to said structure by a corresponding first joint and to said at least one group of working elements by a corresponding second joint, said first and second suspension elements forming a quadrilateral deformable in an at least approximately vertical direction; and at least one lateral suspension element which is connected to said structure by a first joint and to said at least one group of working elements by a second joint; wherein:

axes of said first joints of said two suspension elements and an axis of said second joint of said second suspension element at least approximately define a first plane which is at least approximately vertical and directed, during work, in a forward direction with respect to said direction of work;

an axis of said first joint and an axis of said second joint of said at least one lateral suspension element at least approximately define with the axis of said second joint of said second suspension element a second plane which intersects said first plane along a first straight line;

said first joint of said at least one lateral suspension element at least approximately extends in said first plane and at least approximately in the vicinity of said first joint of said second suspension element in such a manner that said axis of said first joint of said at least one lateral suspension element and said axis of said first joint of said second suspension element are at least approximately merged; and said second joint of said at least one lateral suspension element is distant form said first plane and its axis is at least approximately located on a second straight line passing through the axis of said second joint of said second suspension element and orthogonal to said first straight line.

2. The farm machine according to claim 1, wherein the second plane is at least approximately orthogonal to said first plane when said at least one group of working elements is horizontal.

3. The farm machine according to claim 1, wherein said second joint of said first suspension element at least approximately extends in said first plane when said at least one group of working elements is horizontal.

4. The farm machine according to claim 1, wherein said at least one group of working elements exhibits a vertical median plane and wherein said first plane is at least approximately merged with said median plane.

5. The farm machine according to claim 1, wherein said first plane extends, in normal work, at least approximately in the direction of advance at work.

6. The farm machine according to claim 1, wherein the quadrilateral is drawn at work.

7. The farm machine according to claim 1, wherein the deformable quadrilateral is a deformable parallelogram.

8. The farm machine according to claim 1, wherein said first joint and said second joint of said first suspension element are each of the ball joint type, whose center constitutes the respective axes of said joints.

9. The farm machine according to claim 1, wherein said first joint of said at least one lateral suspension element is of the ball joint type, whose center constitutes the axis of said joint.

10. The farm machine according to claim 1, wherein said second joint of said at least one lateral suspension element is of the ball joint type, whose center constitutes the axis of said joint.

11. The farm machine according to claim 1, wherein
at least two lateral suspension elements are provided; and
on each side of said first straight line at least one of said at least two lateral suspension elements is provided.

12. The farm machine according to claim 11, wherein said second joints of said at least two lateral suspension elements extend at least approximately symmetrical relative to said first straight line.

13. The farm machine according to claim 1, wherein at least one of said at least one lateral suspension element comprises adjusting elements for adjusting a distance separating its first joint from its second joint.

14. The farm machine according to claim 1, wherein said second suspension element extends higher than said first suspension element.

15. The farm machine according to claim 14, wherein said second suspension element extends above said first suspension element.

16. The farm machine according to claim 1, further comprising means for limiting or preventing the displacement of said at least one group of working elements crosswise to the direction of advance at work.

17. The farm machine according to claim 16, wherein the means for limiting or preventing the displacement of said at least one group of working elements crosswise to the direction of advance at work, comprises the first joint of said second suspension element which is of the cylindrical type, whose axis is at least approximately orthogonal to the first plane.

18. The farm machine according to claim 17, wherein said first joint is of the pivot type.

19. The farm machine according to claim 18, wherein the second suspension element comprises two cylindrical bearing surfaces between which a space is provided for pivoting on a journal connected at the level of a first part to a flange of said structure and at the level of a second part to another flange of said structure, to form said first joint of the pivot type of the second suspension element, and wherein a ball joint which is part of said at least one lateral suspension element extends in said space provided between said two cylindrical bearing surfaces of said second suspension element, to form said first joint of said at least one lateral suspension element.

20. The farm machine according to claim 19, wherein said journal comprises a shoulder extending at the level of said space provided between said two cylindrical bearing surfaces of said second suspension element and a threaded part at the level of an outside end of said second part, wherein a sphere of said ball joint is slid over the second part of said journal to the level of said shoulder, wherein a liner is also slid over said second part of said journal to extend between said sphere and at least approximately said outside end of said second part of said journal where the threaded part is provided and wherein a threaded assembling element cooperates with said threaded part of said journal to tighten said sphere of said ball joint between the liner and the shoulder of the journal.

21. The farm machine according to claim 19, wherein said cylindrical bearing surfaces extend at least approximately symmetrical relative to said first plane.

22. The farm machine according to claim 18, wherein the first joint of said second suspension element is formed by two ball joints spaced from one another and whose centers define the axis of said first joint.

23. The farm machine according to claim 22, wherein said two ball joints extend at least approximately symmetrically relative to said first plane.

24. The farm machine according to claim 16, wherein the first joint and the second joint of said first suspension element are each of the ball joint type, whose centers constitute the respective axes of said joints, wherein the first joint of said second suspension element is also of the ball joint type whose center constitutes the axis of said first joint of said second suspension element, and wherein said means for limiting or preventing the displacement of said at least one group of working elements crosswise to the direction of advance at work, limits or stops the pivoting of said at least one group of working elements around a straight line passing through said centers of said first joints of said first and second suspension elements.

25. The farm machine according to claim 24, wherein said means for limiting or preventing the displacement of said at least one group of working elements crosswise to the direction of advance at work acts directly on said at least one group of working elements.

26. The farm machine according to claim 24, wherein said means for limiting or preventing the displacement of said at least one group of working elements crosswise to the direction of advance at work acts directly or indirectly on said second suspension element.

27. The farm machine according to claim 25, wherein said means for limiting or preventing the displacement of said at least one group of working elements crosswise to the direction of advance at work comprises two stops which are integral with said structure.

28. The farm machine according to claim 26, wherein said means for limiting or preventing the displacement of said at least one group of working elements crosswise to the direction of advance at work comprises two stops which are integral with said structure.

29. The farm machine according to claim 26, wherein said means for limiting or preventing the displacement of said at least one group of working elements crosswise to the direction of advance at work comprises an element and two guide surfaces which are at least approximately plane and at least approximately parallel to said first plane, between which said element extends.

30. The farm machine according to claim 29, wherein said element comprises a cylindrical part extending between said two guide surfaces and a longitudinal axis of said cylindrical part being at least approximately merged with said first straight line.

31. The farm machine according to claim 29, wherein said element is carried by said second suspension element.

32. The farm machine according to claim 1, wherein said first and second suspension elements are rigid.

33. The farm machine according to claim 1, wherein at least two lateral suspension elements are provided; and
at least one of said at least two lateral suspension elements is rigid.

34. The farm machine according to claim 1, wherein at least two lateral suspension elements are provided; and
on both sides of said first straight line, at least one of said at least two lateral suspension elements, capable of working essentially or only in pulling, is extended.

35. The farm machine according to claim 1, wherein:
on both sides of said first straight line, at least one rigid lateral suspension element extends;
said second suspension element comprises one or more elements capable of working essentially or only in pulling; and
adjusting elements are provided to prestress said one or more elements of said second suspension element.

36. The farm machine according to claim 35, wherein said second suspension element comprises two elements, each connected at a corresponding front end to a cylindrical bearing surface or to a ball joint and at a corresponding rear end to said second joint of said second suspension element.

37. The farm machine according to claim 35, wherein said adjusting elements are incorporated in said one or more elements of said second suspension element.

38. The farm machine according to claim 35, wherein said one or more elements of said second suspension element extend at least approximately symmetrically relative to said first plane.

39. The farm machine according to claim 1, wherein said structure comprises a bracket at a front end of which are connected said suspension elements and also said at least one lateral suspension element.

40. A farm machine which is movable in a direction of work, comprising:
at least one group of working elements and a structure comprising a hitching means for hitching said farm machine to a motor vehicle during work, said at least one group of working elements being connected to said structure through a suspension device defining a deformable quadrilateral, wherein said suspension device comprises:
a rigid suspension element connected to said structure by a first joint and to said at least one group of working elements by a second joint; and
at least two rigid lateral suspension elements each one of which is connected to said structure by a corresponding first joint and to said group of working elements by a corresponding second joint, said at least two rigid lateral suspension elements forming with said rigid suspension element a quadrilateral deformable in an at least approximately vertical direction, wherein;
an axis of said first joint of said rigid suspension element defines a first plane which is at least approximately vertical and directed, during work, in a forward direction with respect to said direction of work;
axes of said first joints and axes of said second joints of said at least two rigid lateral suspension elements at least approximately define a second plane which intersects said first plane along a first straight line;
said first joints of said at least two rigid lateral suspension elements at least approximately extend in said first plane and at least approximately in the vicinity of each other, and their axes are at least approximately merged; and
said second joints of said at least two rigid lateral suspension elements are distant from said first plane and their axes are at least approximately located on a second straight line orthogonal to said first straight line.

41. The farm machine according to claim 40, wherein said second plane is at least approximately orthogonal to said first plane when the at least one group of working elements is horizontal.

42. The farm machine according to claim 40, wherein said second joint of said suspension element at least approximately extends in said first plane when said at least one group of working elements is horizontal.

43. The farm machine according to claim 40, wherein said at least one group of working elements exhibits a vertical median plane and wherein said first plane is at least approximately merged with said median plane.

44. The farm machine according to claim 40, wherein the first plane extends, in normal work, at least approximately in the direction of advance at work.

45. The farm machine according to claim 40, wherein the quadrilateral is drawn during work.

46. The farm machine according to claim 40, wherein the deformable quadrilateral is a deformable parallelogram.

47. The farm machine according to claim 40, wherein said first joint and said second joint of said suspension element are each of the ball joint type, whose centers constitute the respective axes of said joints.

48. The farm machine according to claim 40, wherein said first joints of said at least two lateral suspension elements are each of the ball joint type, whose centers constitute the respective axes of said joints.

49. The farm machine according to claim 40, wherein said second joints of said at least two lateral suspension elements are each of the ball joint type, whose centers constitute the axes of said joints.

50. The farm machine according to claim 40, wherein on each side of said first straight line, at least one of said at least two lateral suspension elements is provided.

51. The farm machine according to claim 50, wherein said second joints of said at least two lateral suspension elements extend at least approximately symmetrically relative to said first straight line.

52. The farm machine according to claim 40, wherein at least one of said at least two lateral suspension elements comprises adjusting elements for adjusting a distance separating its first joint from its second joint.

53. The farm machine according to claim 40, wherein said at least two lateral suspension elements extend higher than said suspension element.

54. The farm machine according to claim 53, wherein said at least two lateral suspension elements extend above said suspension element.

55. The farm machine according to claim 40, further comprising means for limiting or preventing the displacement of said at least one group of working elements crosswise to the direction of advance at work.

56. The farm machine according to claim 55, wherein said first joint and said second joint of said suspension element are each of the ball joint type, whose centers constitute the respective axes of said joints, wherein said first joints of said at least two lateral suspension elements are each of the ball joint type, whose centers constitute the respective axes of said joints, and wherein said means for limiting or preventing the displacement of said at least one group of working elements crosswise to the direction of advance at work, limits or stops the pivoting of said at least one group of working elements, around a straight line passing through the center of the first joint of said suspension element and the centers of the first joints of said at least two lateral suspension elements.

57. The farm machine according to claim 56, wherein said means for limiting or preventing the displacement of said at least one group of working elements crosswise to the direction of advance at work acts directly on said at least one group of working elements.

58. The farm machine according to claim 56, wherein said means for limiting or preventing the displacement of said at least one group of working elements crosswise to the direction of advance at work acts on at least one of said at least two lateral suspension elements.

59. The farm machine according to claim 58, wherein said means for limiting or preventing the displacement of said at least one group of working elements crosswise to the direction of advance at work comprises a cylindrical pin, a longitudinal axis of which is at least approximately merged with said first straight line and by two guide surfaces which are at least approximately plane and at least approximately parallel to said first plane, between which said cylindrical pin extends.

60. The farm machine according to claim 59, wherein said cylindrical pin is integral with at least one of said at least two lateral suspension elements.

61. The farm machine according to claim 40, wherein said structure comprises a bracket at a front end of which are connected said suspension element and also said at least two lateral suspension elements.

* * * * *